US010176563B2

(12) United States Patent
Kemp et al.

(10) Patent No.: US 10,176,563 B2
(45) Date of Patent: Jan. 8, 2019

(54) MOBILE DEVICE, SYSTEM AND METHOD

(71) Applicant: Sony Corporation, Tokyo (JP)

(72) Inventors: Thomas Kemp, Esslingen (DE); Fabien Cardinaux, Stuttgart (DE); Wilhelm Hagg, Stuttgart (DE); Aurel Bordewieck, Kirchheim unter Teck (DE); Stefan Uhlich, Renningen (DE)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 15/285,801

(22) Filed: Oct. 5, 2016

(65) Prior Publication Data

US 2017/0103514 A1 Apr. 13, 2017

(30) Foreign Application Priority Data

Oct. 13, 2015 (EP) .................................... 15189598

(51) Int. Cl.
| | |
|---|---|
| *G06K 9/00* | (2006.01) |
| *G06F 3/048* | (2013.01) |
| *G06T 7/00* | (2017.01) |
| *G06K 9/46* | (2006.01) |
| *H04N 5/33* | (2006.01) |
| *G06Q 50/12* | (2012.01) |

(52) U.S. Cl.
CPC ............ *G06T 7/0004* (2013.01); *G06F 3/048* (2013.01); *G06K 9/4604* (2013.01); *G06Q 50/12* (2013.01); *H04N 5/332* (2013.01); *G06T 2207/30128* (2013.01)

(58) Field of Classification Search
USPC ....... 382/100, 103, 106–107, 123, 140, 155, 382/162, 168, 173, 181, 189, 191, 199, 382/201, 214, 232, 236, 254, 276, 286, 382/291, 305, 312, 321, 110; 398/128; 340/572.1; 315/158; 704/2; 715/810
See application file for complete search history.

(56) References Cited

U.S. PATENT DOCUMENTS

| | | | | |
|---|---|---|---|---|
| 6,340,864 | B1 * | 1/2002 | Wacyk | H05B 37/02 |
| | | | | 315/158 |
| 7,617,132 | B2 | 11/2009 | Reade et al. | |
| 8,903,708 | B2 * | 12/2014 | Derks | G06Q 30/02 |
| | | | | 704/2 |
| 2007/0268138 | A1 * | 11/2007 | Chung | G01S 5/0018 |
| | | | | 340/572.1 |
| 2008/0044188 | A1 * | 2/2008 | Kagawa | H04B 10/1141 |
| | | | | 398/128 |

(Continued)

OTHER PUBLICATIONS

Erin Thayer "Epicure Digital Menu Boards Revolutionize Restaurant Point-of-Sale", The Point of Sale News, 2011, 8 pages.

(Continued)

*Primary Examiner* — Seyed Azarian
(74) *Attorney, Agent, or Firm* — Xsensus LLP (57) ABSTRACT

A mobile device comprises a sensor and a processor. The sensor is configured to wirelessly receive an identification signal including an item identifier code, the identification signal being emitted by a low-rate transmission device associated with an item, wherein the sensor receives the identification signal from a direction of the item. The processor is configured to generate an output signal based on the item identifier code.

15 Claims, 7 Drawing Sheets

(56) References Cited

U.S. PATENT DOCUMENTS

2011/0307610 A1* 12/2011 Hayashi ................ H04W 12/06
709/225
2014/0310651 A1* 10/2014 Padgett ............. G06F 17/30867
715/810

OTHER PUBLICATIONS

"QA Graphics Collaborates with KB Nutrition Consulting to Aid in Nutritional Menu Labeling", Insurance Technology, 2011, 2 pages.

* cited by examiner

MOBILE DEVICE, SYSTEM AND METHOD

TECHNICAL FIELD

The present disclosure generally pertains to a mobile device, a system and a method for providing user-specific item property information.

TECHNICAL BACKGROUND

There are many different data transmission techniques available. Conventional data transmission techniques make use of a transmitter device that encodes original data and transmits an accordingly encoded signal and of a receiver device that receives the encoded signal and decodes the signal to provide the original data.

For a wireless data transmission the encoded signal is typically represented as a modulated electromagnetic wave, such as an infrared light wave or a visible light wave, as a modulated sound wave such as an ultrasound wave or as a modulated magnetic wave.

Usually, large data sets are necessary to transmit particular information. Therefore, high-rate transmission transmitter devices that are able to transmit high amounts of data are necessary. However, high-rate transmitter devices are complex and have a high power consumption. Thus, in many situations, it is desired to transmit the particular information even via low-rate transmission.

Although there generally exist techniques for data transmission on the basis of low-rate transmission, it is generally desirable to improve methods and apparatuses for data transmission on the basis of low-rate transmission.

SUMMARY

According to a first aspect, the disclosure provides a mobile device, comprising: a sensor configured to wirelessly receive an identification signal including an item identifier code, the identification signal being emitted by a low-rate transmission device associated with an item, wherein the sensor receives the identification signal from a direction of the item; and a processor configured to generate an output signal based on the item identifier code.

According to a second aspect, the disclosure provides a system, comprising: a low-rate transmission device configured to emit an identification signal comprising an item identifier code, wherein the low-rate transmission device is associated with an item; and a mobile device, comprising: a sensor configured to wirelessly receive the identification signal from a direction of the item; and a processor configured to generate an output signal based on the item identifier code.

According to a third aspect, the disclosure provides a method, comprising: wirelessly receiving an identification signal including an item identifier code, the identification signal being emitted by a low-rate transmission device associated with an item, wherein the identification signal is received from a direction of the item; and generating an output signal based on the item identifier code.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Before a detailed description of the embodiments under reference of FIG. 1 to FIG. 16, general explanations are made.

The mobile device, the system and the method described below may be used for providing a user with user-specific item property information about an item of interest.

The item may be a real object in real space. For example, the item may be a food, a piece of clothing, an article of daily use, a tool or the like.

The user-specific item property information may be an information on an item property that is of personal interest for the user. For example, the user-specific item property information may comprise information that the item includes an ingredient or has another property (e.g. a particular color, composition, structure or the like), which is critical for the user's health or which is desired or undesired by the user.

A mobile device comprises a sensor and a processor. The sensor is configured to wirelessly receive an identification signal including an item identifier code, the identification signal being emitted by a low-rate transmission device associated with an item, wherein the sensor receives the identification signal from a direction of the item. The processor is configured to generate an output signal based on the item identifier code.

Optional features of the mobile device are discussed below with respect to a system described in the following. Each of the optional features of the mobile device described below, separate or in combination with one or more other features, is to be understood as a feature of the mobile device as an apparatus decoupled from the system as well. Also, optional features of the identification signal, which are explained below as features of the low-rate transmission device, are to be understood as separate optional features of the mobile device decoupled from the system.

A system comprises a low-rate transmission device and a mobile device. The low-rate transmission device is configured to emit an identification signal comprising an item identifier code, wherein the low-rate transmission device is associated with an item. The mobile device comprises a sensor configured to wirelessly receive the identification signal from a direction of the item and a processor configured to generate an output signal based on the item identifier code.

The item identifier code may comprise information on a property of the item. For example, the item identifier code may include a list of indications whether the item comprises one or more ingredients and/or properties of a group of ingredients and/or other properties. Further details of the item identifier code are explained below.

The output signal may be a signal adapted to provide the user with user-specific item property information. For example, the output signal is a warning signal indicating that the item comprises one or more properties, e.g. properties that are critical for the user's health or that are desired or undesired by the user.

In some embodiments the low-rate transmission device may be configured to emit a modulated signal as an identification signal. Accordingly, the identification signal may be a modulated signal. A modulation of the modulated signal may be in accordance with the item identifier code included in the identification signal.

The low-rate transmission device may be configured to emit an electromagnetic wave as identification signal, e.g. an infrared light wave, a visible light wave or the like. Alternatively, the low-rate transmission device may be configured to emit a sound wave, e.g. an ultrasound wave or the like, or to provide a magnetic field. Accordingly, the identification signal may be an electromagnetic wave, a sound wave or a magnetic field, preferably a modulated electromagnetic wave, a modulated sound wave or a modulated magnetic field. In some cases the low-rate transmission device may alternatively have a static magnetic field.

In some embodiments the item identifier code of the identification signal may be a bit-vector or a bit-matrix of 50 bit or less, preferably of 32 bit or less. For example, the item identifier code may be a bit-vector, wherein each bit represents one property of the item and indicates whether the item comprises the corresponding property or not. E.g., each bit may represent a particular ingredient of the item and may indicate whether the item comprises the corresponding ingredient or not.

In some embodiments the low-rate transmission device may be arranged at a location in a predetermined area surrounding the item or at the item itself. An extension of the predetermined area may depend on a size of the item and a distance to neighboring items. E.g. if the item has an extension of about 20 to 40 cm, the predetermined area may be a periphery of about 50 cm or less around a center point or a center of gravity of the item. In such an arrangement, the low-rate transmission device may be configured to emit the identification signal directly towards the sensor. The low-rate transmission device may be configured to emit a signal having high directivity. A signal having high directivity may be a signal emitted within a radiation cone of 50° or less, preferably of 30° or less.

Alternatively, the low-rate transmission device may be arranged to illuminate the item. In such an arrangement, the low-rate transmission device may be configured to emit the identification signal towards the item, such that the identification signal is reflected by the item towards the sensor. E.g. the low-rate transmission device may be arranged above the item and may be oriented to emit the item identifier signal towards the item, so that the emitted light is reflected at the item in a direction of the sensor. The low-rate transmission device may be configured to emit a signal which is not directed at all or which has low or even high directivity.

In some embodiments the low-rate transmission device may be an emitter configured to emit an electromagnetic wave, a sound wave or a magnetic signal. Accordingly, the sensor of the mobile device may be a sensor configured to detect an electromagnetic wave, a sound wave or a magnetic signal. Preferably, the sensor may be configured to detect electromagnetic waves of different wavelengths, sound waves of different wavelengths and/or different magnetic fields.

For example, the low-rate transmission device may comprise an infrared light emitter configured to emit infrared light as an identification signal. In this case, the sensor may comprise or may be an infrared light sensor or an image sensor that is adapted to detect infrared light as well. The infrared light sensor may be a semiconductor-based sensor or any other sensor configured to detect infrared light, such as a thermal detector, a pyroelectric detector or the like. The image sensor adapted to detect infrared light may be a CCD sensor, a CMOS sensor or any other semiconductor-based image sensor configured to detect infrared light.

Alternatively, the low-rate transmission device may comprise a visible light source configured to emit visible light as an identification signal. In this case, the sensor may comprise or may be an image sensor, such as a CCD sensor, a CMOS sensor or any other semiconductor-based image sensor.

Alternatively, the low-rate transmission device may comprise a permanent magnet having a static magnetic field or an electromagnet generating a modulated magnetic field. In this case, the sensor may comprise or may be a magnetic field sensor, for example a Hall sensor or the like.

In some embodiments the processor may be configured to determine on the basis of the item identifier code, whether the item has a predetermined property or not, and to generate the output signal dependent on whether the item has the predetermined property or not. Preferably, the processor may be configured to compare the item identifier code with a user-specific code, that is stored in a data storage of the mobile device, and to generate the output signal only when the item has a property that affects the user in a personal way.

The user-specific code may be information on a property that affects the user in a personal way, e.g. that the user considers as disadvantageous, critical or advantageous. For example, the user-specific code may include a list of indications whether one or more ingredient and/or property of a group of ingredients and/or other properties affects the user, e.g. in a positive or negative manner.

For example, the item identifier code may be a bit-vector comprising a sequence of bits, wherein each bit represents one property and indicates whether the item of interest comprises this property. The user-specific code may also comprise a bit-vector comprising a sequence of bits, wherein each bit represents one property and indicates whether the property affects the user. The bits representing the property are arranged in the item identifier code in the same order as in the use-specific code. Then the processor may be configured to compare the bit-vectors of the item identifier code and of the user-specific code and to generate an output signal only, when corresponding bits of both vectors are active thus indicating that the item comprises a property that affects the user.

The processor may be configured to generate an image signal, an audio signal and/or a tactile signal as output signal.

In some embodiments the processor may be further configured to determine an item location information based on a positional relationship of the sensor relative to the item and to generate the output signal further based on the item location information.

The positional relationship may be an orientation of the sensor relative to the item and/or relative to a direction from which the sensor receives the identification signal. Such an orientation may be determined on the basis of a structure of the sensor, e.g. a known aperture angle or the like, and/or on the basis of whether the identification signal is detected or not or on the intensity of the identification signal. In addition or alternatively, the positional relationship may be a distance from the sensor to the item. The distance may be determined on the basis of a known emitting range of the low-rate transmission device and/or on the basis of whether the identification signal is detected or not or on the basis of the intensity of the identification signal.

In some embodiments the low-rate transmission device may be configured to emit a signal having high directivity as identification signal, preferably an infrared signal. In this case, the sensor may have a small aperture angle. Thus, the sensor may be able to detect the infrared signal only when the sensor is oriented with its sensitive surface so that the identification signal meets the sensitive surface at a predetermined angle to the sensitive surface, e.g. at an angle of about 70° to 110° to the sensitive surface, preferably of about 90°. Then, the processor may be configured to determine—preferably using the information that the identification signal has high directivity and that the sensor has a small aperture angle—the item location information on the basis of whether the sensor receives the identification signal and to generate the output signal only when the identification signal is received. For example, the processor may generate the output signal only when the sensor receives the identification signal, preferably only, when the sensor receives the identification signal and the item has a property affecting the user as described above. The item location information may be the orientation of the sensor relative to the item or an area surrounding the item.

Alternatively, the sensor may be an image sensor configured to capture consecutive images of a scene including the item, e.g. a video of the scene including the item. In this case, the processor may be configured to determine the item location information by recognizing an area or a point within a region of the image, representing the item or representing a predetermined area surrounding the item. The item location information may comprise a location of the pictorial representation of the item in the video.

In some embodiments the mobile device further may comprise a user interface configured to output the output signal.

In some embodiments the user interface may comprise a display means, such as a visible light source, a display, a projector or the like, an audio interface, such as a loudspeaker or the like, and/or a tactile interface, such as a mechanical vibrator for providing a vibrating alert or the like. The light source may be a light emitting diode (LED) emitting visible light. The display may be a liquid crystal display (LCD), a thin-film transistor-display (TFT-display), a plasma display panel (PDP) or any other display.

In some embodiments the user interface may be a display means that is configured to display a virtual object such that the virtual object overlaps the item or an image of the item in a direction perpendicular to a plane of the display means or in a viewing direction of a user using the mobile device. The virtual object may be a coloring, a warning symbol such as a cross, an exclamation mark or an emoji, or the like.

In some embodiments, the mobile device may be a wearable device. For example, the mobile device may be one selected from a smart phone, a tablet computer, a smart watch, an electronic wristband (smart band), electronic glasses, an e-book reader, a smart lens or the like.

A method comprises wirelessly receiving an identification signal including an item identifier code, the identification signal being emitted by a low-rate transmission device associated with an item, wherein the identification signal is received from a direction of the item, and generating an output signal based on the item identifier code.

The identification signal may be a modulated signal. A modulation of the modulated signal may be in accordance with the item identifier code included in the identification signal.

The identification signal may be an electromagnetic wave, e.g. an infrared light wave, a visible light wave or the like, a sound wave, e.g. an ultrasound wave or the like, or a magnetic field. Preferably, the identification signal is a modulated electromagnetic wave, a modulated sound wave or a modulated magnetic field. Alternatively, the identification signal may be a static magnetic field.

In some embodiments the item identifier code of the identification signal may be a bit-vector or a bit-matrix of 50 bit or less, preferably of 32 bit or less. As already mentioned above, each bit of the bits of the bit-vector may represent one property of the item and indicate whether the item comprises the corresponding property or not.

In some embodiments receiving the identification signal may comprise receiving the identification signal directly from the low-rate transmission device. Alternatively, receiving the identification signal may comprise receiving the identification signal as a signal reflected by the item. Generating the output signal may then further dependent on a way of receiving the identification signal. The way of receiving may be set in advance, preferably dependent on the type of the low-rate transmission device and/or its arrangement relative to the item.

In some embodiments the method may comprise determining on the basis of the item identifier code, whether the item has a predetermined property or not and generating the output signal dependent on whether the item has the predetermined property or not. Preferably, the item identifier code may be compared with a user-specific code explained above, which is input in advance by the user, and the output signal may be generated only when the item has a property that affects the user in a personal way.

In some embodiments the method may comprise determining an item location information based on a positional relationship of the sensor relative to the item and generating the output signal further based on the item location information. With respect to the positional relationship it is referred to the discussion of the system above.

In some embodiments receiving the identification signal may comprise receiving a signal having high directivity with a sensor having a small aperture angle and generating the output signal may comprise determining the item location information on the basis of whether the sensor receives the identification signal or not and generating the output signal only when the identification signal is received. In this case, the infrared signal may only be received, when the sensor is oriented with its sensitive surface so that the identification signal meets the sensitive surface at a predetermined angle, the item location information may be determined—preferably using the information that the identification signal has high directivity and that the sensor has a small aperture angle—on the basis of whether the sensor receives the identification signal and the output signal may be generated only when the identification signal is received. The item location information may be the orientation of the sensor relative to the item or an area surrounding the item.

In some embodiments receiving the identification signal may comprise capturing consecutive images of a scene including the item and determining the item location information may comprise recognizing an area or a point within a region of the image, the region of the image representing the item or a predetermined area surrounding the item. The item location information may comprise a location of the pictorial representation of the item in the video.

Generating the output signal may comprise generating an image signal, an audio signal and/or a tactile signal as output signal.

The method may further comprise outputting the output signal. The output signal may be the image signal, the audio signal and/or the tactile signal.

In some embodiments outputting the output signal may comprise displaying a virtual object such that the virtual object overlaps the item or an image of the item in a direction perpendicular to a plane of display means used as user interface or in a viewing direction of a user using a mobile device described above.

Furthermore, all optional features referring to method steps explained above with respect to the system are to be understood also as optional features of the method.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In the following, demonstrative embodiments of systems for providing user-specific item property information are explained with reference to FIG. 1 to FIG. 16.

There are a lot of people today that are allergic to different types of food. The most well-known examples are peanuts and strawberries. There is a short list of 14 ingredients of food that are responsible for 90% of all allergies, which means that a food can identify itself by a 14-bit-vector. As the information density required to transmit that information is very low, a cheap low-rate data transmission system can be used even in very congested channels (e.g. if many people are around, say, in a cafeteria) or over ineffective, slow and noisy transmission media. Thus, the available food can identify its allergic potential by broadcasting a set of 14 bits to anyone that needs to know, allowing the user an informed selection from the available offering.

Since there are a lot of people today that are allergic to different types of food, it can be very cumbersome for customers with allergies to locate this information case by case, sift through it, and perform a selection.

Therefore, the following embodiments concentrate on corresponding applications. However, the mobile device and the system for providing user-specific item property information may be used in other applications.

First Embodiment

Figure 1:
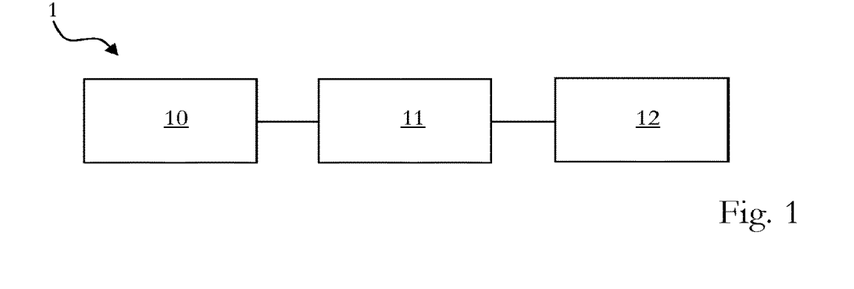
FIG. 1 schematically illustrates a block diagram of a mobile device for providing user-specific item property information.

FIG. 1 illustrates a generalized operational structure of a mobile device 1 for providing user-specific item property information. The mobile device 1 comprises a sensor 10, a processor 11 connected to the sensor 10 and an output 12 connected to the processor 11.

Figure 2:
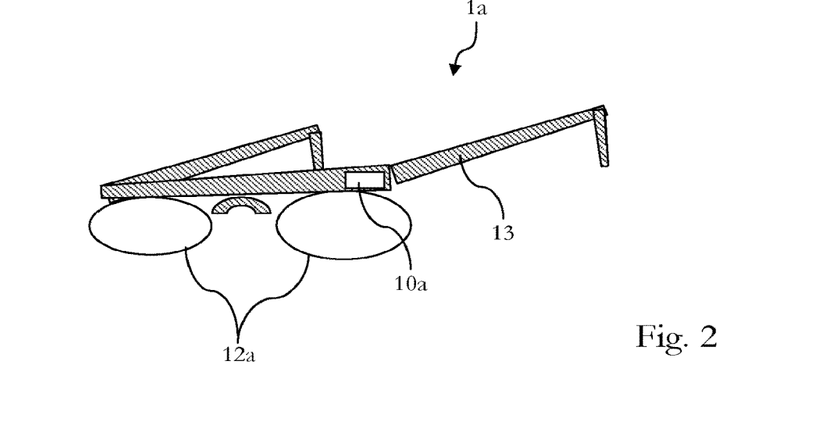
FIG. 2 schematically illustrates smart glasses as mobile device of a first embodiment of a system for providing user-specific item property information.

As shown by FIG. 2, smart glasses 1a represent the mobile device 1 of the first embodiment. The smart glasses 1a comprise a glasses frame 13 that supports a CCD-sensor 10a and eyeglass lenses 12a. The CCD-sensor 10a is configured to capture a video of a real-world scene, to detect infrared waves and to provide sensor data. The eyeglass lenses 12a are formed of transparent displays for displaying virtual images overlaying the real-world scene to provide a mixed reality scene. The glasses frame 13 further supports a processor (not shown in FIG. 2) for generating an output signal, the processor being connected to the CCD-sensor 10a to receive sensor data and to the eyeglasses lenses 12a to provide the output signal.

Figure 3:
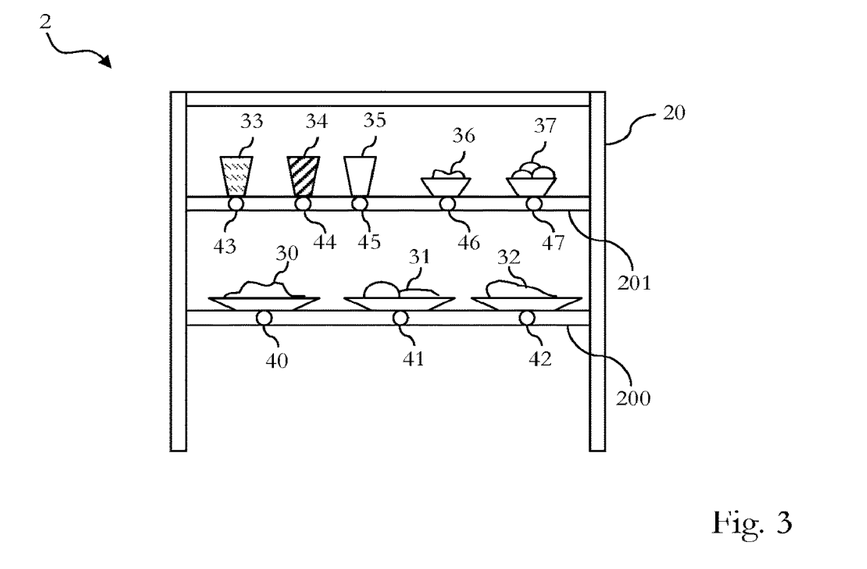
FIG. 3 schematically illustrates a real-world scene including a self-service counter comprising a plurality of infrared light diodes, each associated with a food item, the self-service counter being part of the system of the first embodiment.

A real-world scene 2, in which the mobile device 1 can be used, is illustrated by FIG. 3. The real-world scene 2 includes a self-service counter 20 in a cafeteria, which contains a lower case board 200 and an upper case board 201. On the case boards 200, 201 food items 30 to 37 are located, wherein food items 30 to 32 present main dishes, food items 33 to 35 beverages and food items 36 and 37 deserts.

The case boards 200, 201 are provided at a front surface of each case board 200, 201 with a plurality of low-rate transmission devices in form of infrared diodes 40 to 47 arranged at predetermined distances. The front surface is a surface of each case board 200, 201 that is oriented towards a guest visiting the cafeteria.

The lower case board 200 comprises a left infrared diode 40, a middle infrared diode 41 and a right infrared diode 42. A pasta dish 30 is located on the lower case board 200 in close proximity of the left infrared diode 40 (near to the left infrared diode 40), a meat dish with soya beans 31 is located on the lower case board 200 in close proximity of the middle infrared diode 41 and a fish dish 32 is located on the lower case board 200 in close proximity of the right infrared diode 42. On the upper case board 201 a glass of milk 33 is located in close proximity of infrared diode 43, a glass of water 34 in close proximity of infrared diode 44, a glass of juice 35 in close proximity of infrared diode 45, a fruit salad with nuts 36 in close proximity of infrared diode 46 and ice cream 37 in close proximity of infrared diode 47.

The left infrared diode 40 emits a modulated infrared wave adapted to transmit a 14-bit-vector characterizing the pasta dish 30. Accordingly, the middle infrared diode 41 emits a modulated infrared wave adapted to transmit a 14-bit-vector characterizing the meat dish with soya beans 31 and the right infrared diode 42 emits a modulated infrared wave adapted to transmit a 14-bit-vector characterizing the fish dish 32. In a corresponding way, each of infrared diodes 43 to 47 emits a modulated infrared wave adapted to transmit a 14-bit-vector characterizing each of food items 33 to 37.

A 14-bit-vector characterizing a food item is based on a list of 14 ingredients that may trigger an allergy. The list has a predetermined order. The list contains in the following order gluten-containing grains (first bit), eggs (second bit), peanut (third bit), fish (fourth bit), crustacean (fifth bit), lupines (sixth bit), lactose (seventh bit), nuts (eighth bit), sulfur dioxide/sulfides (ninth bit), celery (tenth bit), mustard (eleventh bit), sesame seeds (twelfth bit), soya beans (thirteenth bit) and mollusca (fourteenth bit).

The 14-bit-vector transmitted by the left infrared diode 40 may indicate by providing an active first bit and an active tenth bit, that the pasta dish 30 comprises gluten-containing grains and celery. The remaining bits of the vector are inactive. Accordingly, the 14-bit-vector transmitted by the middle infrared diode 41 may indicate by providing an active third bit, that the meat dish 31 comprises peanuts. The 14-bit-vector transmitted by the right infrared diode 42 may indicate by providing an active fourth bit and an active fifth bit, that the fish dish 32 comprises fish and crustacean. In a corresponding way, the 14-bit-vectors transmitted by infrared diodes 43 to 47 indicate which of the allergy-triggering ingredients is contained in the corresponding food items 33 to 37.

Figure 4:
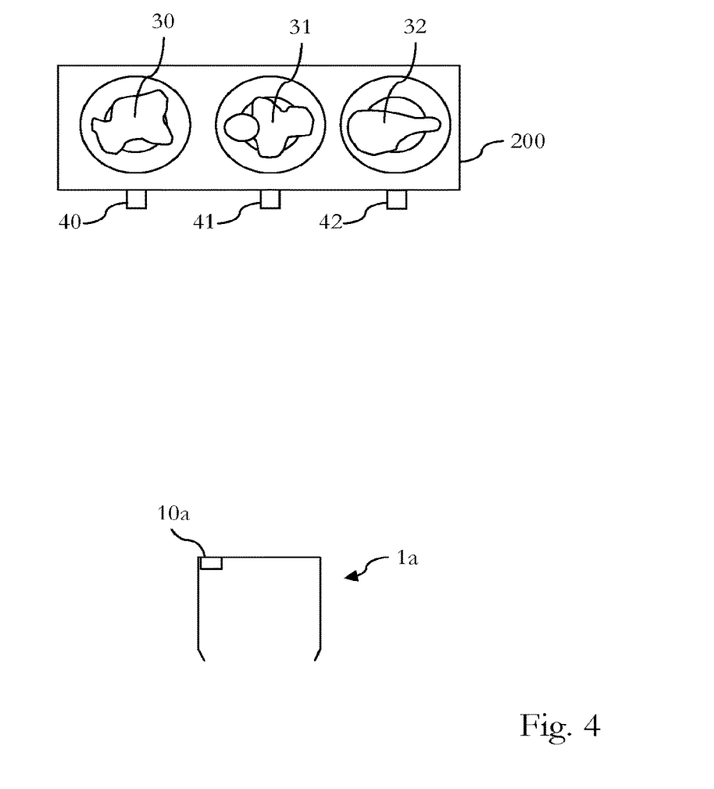
FIG. 4 schematically illustrates a plan view of the system for providing user-specific item property information according to the first embodiment.

As presented by FIG. 4 the mobile device in form of smart glasses 1a is used in the described real-world scene 2 of FIG. 3. FIG. 4 shows a view from above on the food items 30 to 32 on the lower case board 200 and on the smart glasses 1a. The smart glasses 1 are positioned in front of the self-service counter 20 of the real-world scene 2 and are oriented such that the CCD-sensor 10a is oriented towards the self-service counter 20.

In the following, a method 5 for providing user-specific item-property information is described referring to FIG. 4 to FIG. 7.

Figure 5:
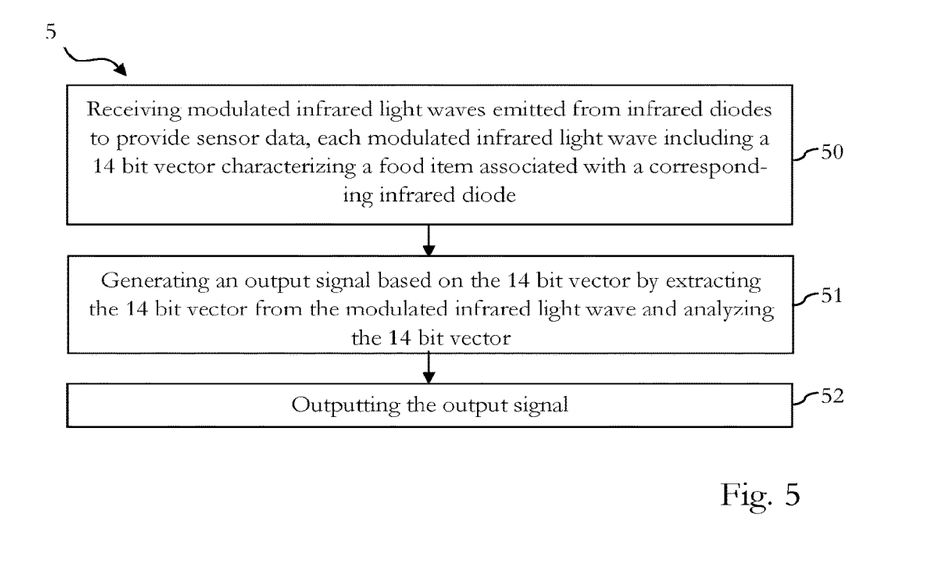
FIG. 5 schematically illustrates a method for providing user-specific item property information.

At 50 of FIG. 5 the CCD-sensor 10a of the smart glasses 1a receives modulated infrared waves emitted from the infrared diodes 40 to 42 from a direction of the corresponding food item 30 to 32, each modulated infrared wave including a 14-bit-vector characterizing a food item. For receiving the modulated infrared waves, the CCD-sensor 10a captures consecutive images of a section of the scene 2. The CCD-sensor 10a generates sensor data of the consecutive images and provides them to the processor.

Figure 6:
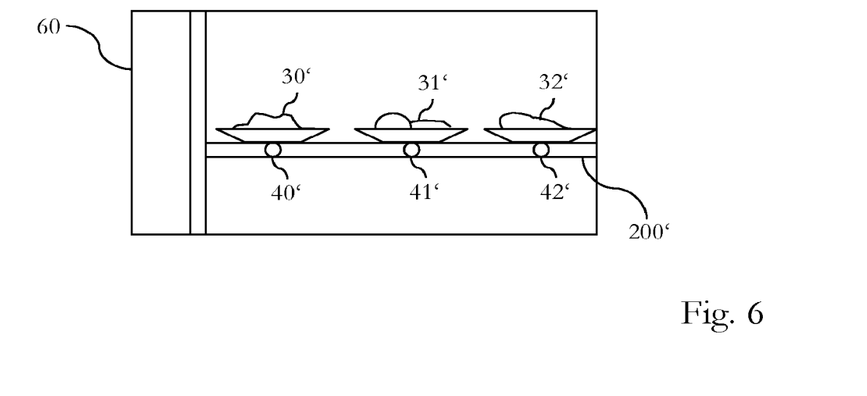
FIG. 6 schematically illustrates an image of a section of the real-world scene presented by FIG. 3.

The sensor data includes as an example an image 60 as presented by FIG. 6. The image 6 shows a reproduction 200' of the lower case board 200 of the service counter 20 and a reproduction 30' to 32' of the food items 30 to 32 located thereon. The image 60 further shows a reproduction 40' to 42' of the infrared diodes 40 to 42, wherein the reproduction 40' to 42' within consecutive images comprises the modulated infrared signal.

At 51 the processor generates an output signal on the basis of the 14-bit-vectors, each characterizing a food item. For generating the output signal the processor extracts from the sensor data the 14-bit-vector characterizing the pasta dish 30 transmitted by the infrared diode 40 as modulated infrared signal and a location of the reproduction 30' of the pasta dish 30 in the image, the 14-bit-vector characterizing the meat dish 31 transmitted by the infrared diode 41 as modulated infrared signal and a location of the reproduction 31' of the meat dish 31 in the image and the 14-bit-vector characterizing the fish dish 32 transmitted by the infrared diode 42 as modulated infrared signal and a location of the reproduction 32' of the fish dish 32 in the image. Based on the 14-bit-vectors characterizing the food items 30 to 32 and the locations of the reproductions of each food item 30 to 32 the processor creates the output signal.

For creating the output signal, the processor compares each of the 14-bit-vectors characterizing the food items 30 to 32 with a user-specific 14-bit-vector. The user-specific 14-bit-vector is based on the same list of 14 ingredients that may trigger an allergy as the 14-bit-vector characterizing a food item and indicates, to which of the allergy-triggering ingredients the user of the smart glasses 1a is allergic. The user-specific 14-bit-vector is personally generated by the user in advance and is stored in a data storage of the smart glasses 1a.

The user may be allergic to gluten-containing cereals, eggs and lactose. Accordingly, the user-specific 14-bit-vector may comprise an active first bit, an active second bit and an active seventh bit.

When comparing a 14-bit-vector characterizing a food item with the user-specific 14-bit-vector, the processor determines whether a bit of the user-specific 14-bit-vector corresponding to one active bit of the 14-bit-vector characterizing the food item is active. The output signal depends on the result of the comparison.

For example, the comparison of the 14-bit-vector characterizing the pasta dish 30 with the user-specific 14-bit-vector shows that the first bit of both vectors is active. As a result of the comparison it is determined that the user reacts allergic to one of the ingredients of the pasta dish 30.

The comparison of the 14-bit-vector characterizing the meat dish 31 with the user-specific 14-bit-vector and the comparison of the 14-bit-vector characterizing the fish dish 32 with the user-specific 14-bit-vector shows no congruence, that is, the active bits of the 14-bit-vector characterizing the meat dish 31 and of the 14-bit-vector characterizing the fish dish 32 are not active in the user-specific 14-bit-vector. As a result of the comparison it is determined that the probability is low that the user reacts allergic to one of the ingredients of the meat dish 31 or the fish dish 32.

The output signal generated by the processor is an image signal taking into account the results of vector comparison and the locations of the pictorial reproductions 30' to 32' of the food items. The image signal includes virtual objects like a colored area associated with the food items that contain an ingredient the user is allergic to. The image signal does not mark the other food items.

Figure 7:
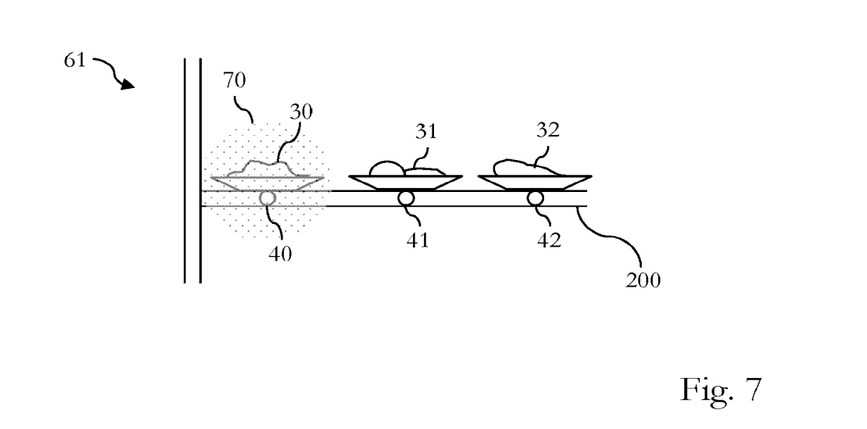
FIG. 7 schematically illustrates a section of a user's view on the scene presented by FIG. 3 through the smart glasses.

At 52 the image signal generated by the processor is displayed by the transparent displays 12a of the smart glasses 1a to generate a mixed reality application 61. The transparent displays 12a of the eyeglass lenses 12a display a colored area 70 (coloring), so that a mixed reality 61 as presented by FIG. 7 is generated, wherein the colored area 70 appears to be overlaid on the pasta dish 30 in the real world scene.

When the user recognizes the colored area 7, he is informed that a food item triggers an allergy. In this case, the user may abstain from choosing this food item.

By providing the output signal of the processor via mixed reality the user's privacy is protected and other visitors of the cafeteria are not affected at all.

Second Embodiment

The second embodiment uses smart glasses 1a as mobile device. The hardware structure of the smart glasses 1a conforms to that explained above with respect to FIG. 2.

Figure 8:
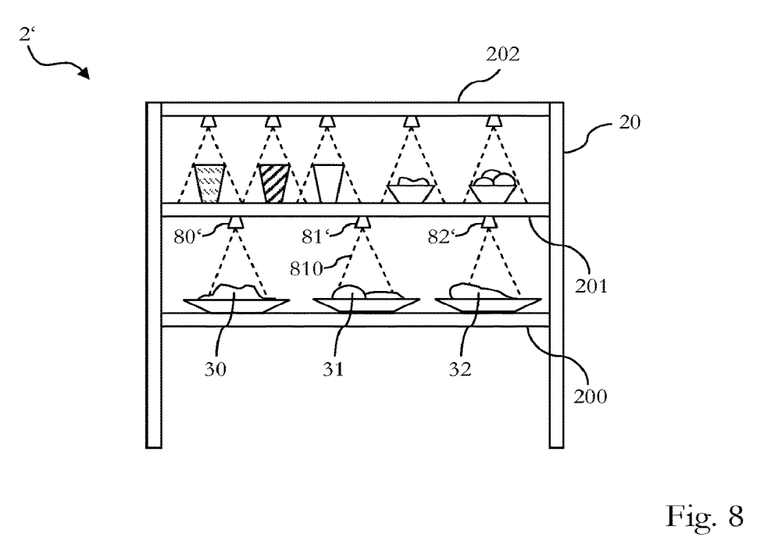
FIG. 8 schematically illustrates a real-world scene including a self-service counter comprising a plurality of visible light sources, each illuminating a food item, the self-service counter being part of a system for providing user-specific item property information according to a second embodiment.

A real-world scene 2', in which the mobile device 1a can be used in the second embodiment, is illustrated by FIG. 8. The real-world scene 2' includes a self-service counter 20 in a cafeteria, which contains a lower case board 200, an upper case board 201 and a cover case board 202. On the case boards 200, 201 food items 30 to 37 are located, wherein food items 30 to 32 present main dishes, food items 33 to 35 beverages and food items 36 and 37 deserts. The cover case board 202 is arranged above the upper case board 201.

The upper case board 201 is provided at a surface oriented towards the lower case board 200 with LEDs 80 to 82 arranged at predetermined distances and the cover case board 202 is provided at a surface oriented towards the upper case board 201 with LEDs 83 to 87 arranged at predetermined distances. The LEDs 80 to 87 emit visible light waves 810.

The upper case board 201 comprises a left LED 80, a middle LED 81 and a right LED 82. The pasta dish 30 is located on the lower case board 200 below the LED 80 to be illuminated with visible light of the LED 80, the meat dish with soya beans 31 is located on the lower case board 200 below the LED 81 to be illuminated with visible light of the LED 81 and the fish dish 32 is located on the lower case board 200 below the LED 82 to be illuminated with visible light of the LED 82. On the upper case board 201 a glass of milk 33 is located below LED 83, a glass of water 34 below LED 84, a glass of juice 35 below LED 85, a fruit salad with nuts 36 below LED 86 and ice cream 37 below LED 87.

The left LED 80 emits a modulated visible light wave adapted to transmit a 14-bit-vector characterizing the pasta dish 30 to the pasta dish 30 that reflects the modulated visible light wave to the CCD-sensor 10a. In a corresponding way, each of LEDs 81 to 87 emits a modulated visible light wave adapted to transmit a 14-bit-vector characterizing each of food items 31 to 37 to the corresponding food item 31 to 37 reflecting the modulated visible light wave.

With respect to the 14-bit-vector characterizing a food item it is referred to the description of the first embodiment above.

The mobile device in form of smart glasses 1a is used in the described real-world scene 2' of FIG. 8. The smart glasses 1a are positioned in front of the self-service counter 20 of the real-world scene 2'.

In the following, a method for providing user-specific item-property information is described referring to FIG. 9 and FIG. 10.

The CCD-sensor 10a of the smart glasses 1a captures consecutive images of a section of the scene 2'. The CCD-sensor 10a generates sensor data of the consecutive images and provides them to the processor.

Figure 9:
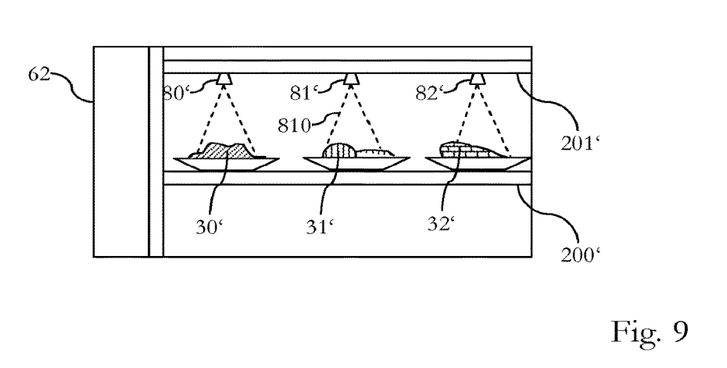
FIG. 9 schematically illustrates an image of a section of the scene presented by FIG. 8.
Figure 10:
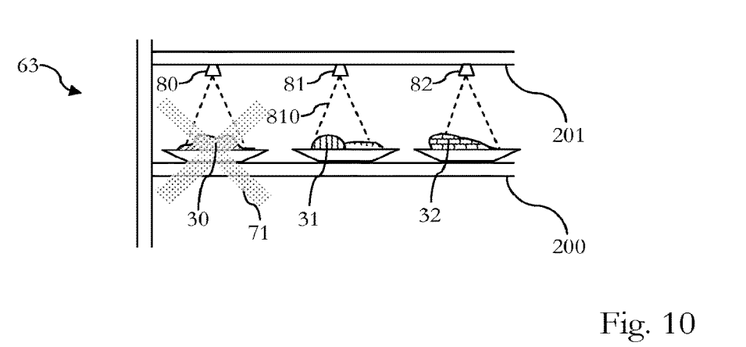
FIG. 10 schematically illustrates a section of a user's view on the scene of FIG. 8 through the smart glasses.

The sensor data includes as an example an image 62 as presented by FIG. 9. The image 62 shows a pictorial reproduction 200' of the lower case board 200, a pictorial reproduction 201' of the upper case board 201 of the service counter 20 and a pictorial reproduction 30' to 32' of the food items 30 to 32 located thereon. The image 62 further shows a reproduction 80' to 82' of the LEDs 80 to 82 arranged at the bottom surface of the upper case board 201. As indicated by the pattern (hatching) of the pictorial reproductions 30' to 32', the food items 30 to 32 reflect the modulated visible light wave, wherein the pictorial reproductions 30' to 32' within consecutive images comprise the modulated signal.

The processor extracts from the sensor data the 14-bit-vector characterizing the pasta dish 30 transmitted by the modulated visible light wave reflected from the pasta dish 30 and a location of the reproduction 30' of the pasta dish 30 in the image 62, the 14-bit-vector characterizing the meat dish 31 transmitted by the modulated visible light wave reflected from the meat dish 31 and a location of the reproduction 31' of the meat dish 31 in the image 62 and the 14-bit-vector characterizing the fish dish 32 transmitted by the modulated visible light wave reflected from the fish dish 32 and a location of the reproduction 32' of the fish dish 32 in the image 62. Based on the 14-bit-vectors characterizing the food items 30 to 32 and the locations of the reproductions of each food item 30 to 32 the processor generates an output signal in an analogous way as in the first embodiment described above.

The image signal generated by the processor is then displayed by the transparent displays of the smart glasses 1a to generate a mixed reality application 63. The transparent displays of the eyeglass lenses 12a display a virtual object 71 in form of a cross, so that a mixed reality 63 as presented by FIG. 10 is generated, wherein the virtual object 71 appears to be overlaid on the pasta dish 30 in the real world scene.

Third Embodiment

Figure 11:
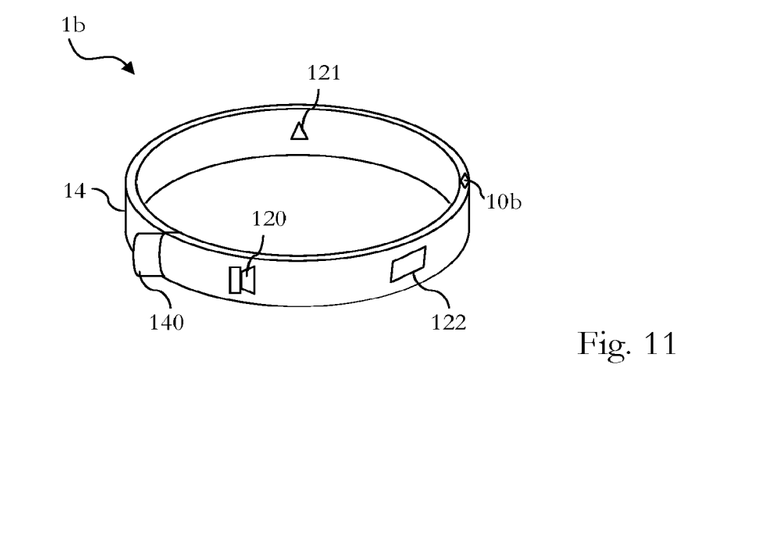
FIG. 11 schematically illustrates a smart band as mobile device of a third embodiment of a system for providing user-specific item property information.

As shown by FIG. 11, the mobile device of the third embodiment is represented by smart band 1b. The smart band 1b comprises a band body 14 with a fastener 140. The band body 14 supports an infrared sensor 10b for detecting infrared waves and output units such as a loudspeaker 120, a vibrating unit 121 and an LED 122. The infrared sensor 10b is arranged at an edge surface of the band body 14 that is arranged perpendicular to a contact surface of the band body 14 being in contact with a user's wrist and oriented towards the user's hand when it is worn. The band body 14 further supports a processor (not shown in FIG. 11), which is connected to the infrared sensor 10b to receive sensor data and to generate an output signal and to the output units to provide them with the output signal.

The smart band 1b is for example used in a real-world scene 2 as illustrated by FIG. 3. With respect to the details of the real-world scene 2 it is referred to the description of the first embodiment above.

Figure 12:
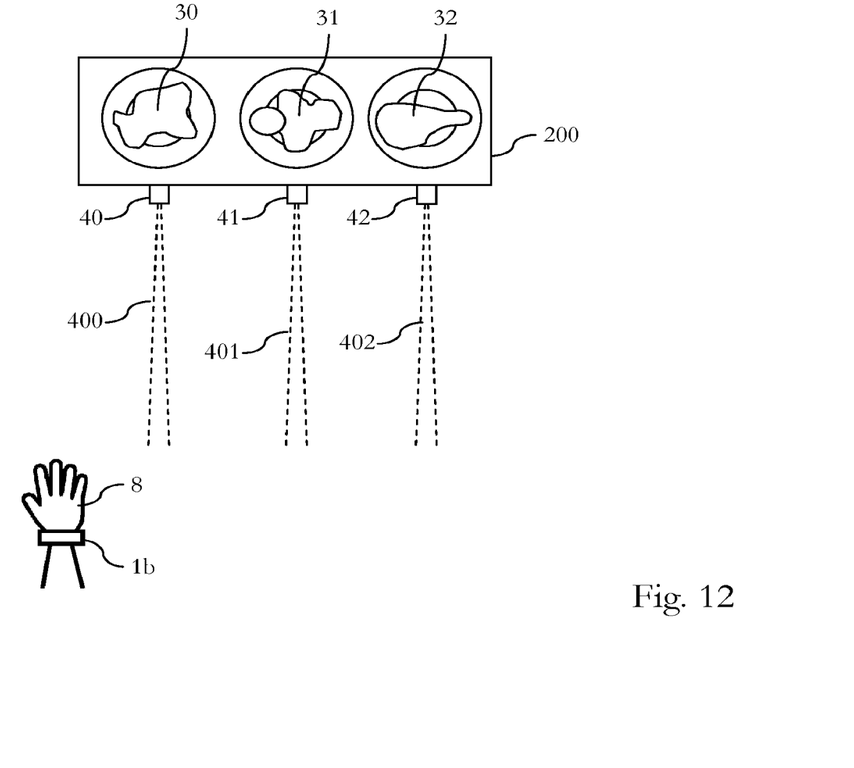
FIG. 12 schematically illustrates a plan view of the system according to the third embodiment.

FIG. 12 shows a view from above on the food items 30 to 32 on the lower case board 200 and on a user's arm wearing the smart band 1b. The smart band 1b is attached to the user's wrist so that the infrared sensor 10b at the edge surface of the band body 14 is oriented towards the user's hand 8. The user's arm is positioned in front of the self-service counter 20 of the real-world scene 2.

As presented in FIG. 12 each of the infrared diodes 40 to 42 emit a modulated infrared wave adapted to transmit a 14-bit-vector characterizing a food item as described above with respect to the first embodiment. The emitted modulated infrared waves have a high directivity as presented by the radiation cones 400 to 402.

In the situation shown by FIG. 12, the user's hand is located remotely from the infrared diodes 40 to 42 and the infrared sensor 10b does not detect a signal.

Figure 13:
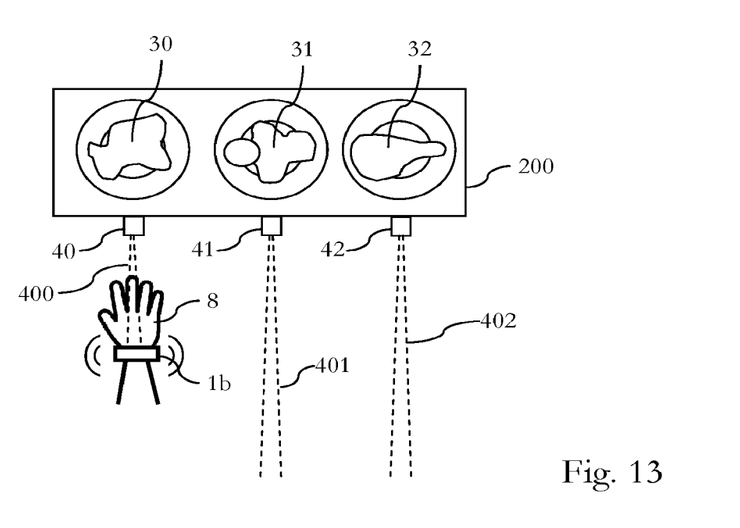
FIG. 13 schematically illustrates a plan view of the system according to the third embodiment, where the smart band approaches a particular item on the self-service counter.

If the user moves his hand towards the infrared diode 40 as presented by FIG. 13, the infrared wave meets the infrared sensor at the edge surface oriented towards the infrared diode 40 and the infrared sensor 10b receives the modulated infrared wave from the infrared diode 40. On the basis of the received modulated infrared wave the infrared sensor 10b generates a sensor signal.

The processor extracts from the sensor data the 14-bit-vector characterizing the pasta dish 30 based on the modulated infrared signal transmitted by the infrared diode 40 and compares the 14-bit-vectors characterizing the fish dish 32 with a user-specific 14-bit-vector such as the user-specific 14-bit-vector of the first embodiment.

When comparing the 14-bit-vector characterizing the pasta dish 30 with the user-specific 14-bit-vector, the processor determines whether a bit of the user-specific 14-bit-vector corresponding to one active bit of the 14-bit-vector characterizing the pasta dish 30 is active. As a result of the comparison it is determined that the user reacts allergic to one of the ingredients of the pasta dish 30. In this case, an output signal is generated that is a combination of an audio signal and a tactile signal.

The output signal generated by the processor is output as warning sound by the loudspeaker 120 and as vibration by the vibrating unit 121.

The user may also move his hand towards the meat dish 31. As soon as the sensor receives the modulated infrared wave from the infrared diode 41 and provides sensor data, the processor carries out a comparison as described with respect to the pasta dish 30. The processor determines that the comparison of the vectors shows no congruence, that is, no active bits of the 14-bit-vector characterizing the meat dish 31 corresponds to an active bit in the user-specific 14-bit-vector. As a result of the comparison it is determined that the probability is low that the user reacts allergic to one of the ingredients of the meat dish 31. In this case no output signal is generated.

A corresponding procedure is performed when the user moves his hand towards the fish dish 32.

Fourth Embodiment

The fourth embodiment is similar to the third embodiment. Therefore, only the differences are outlined here.

The infrared diodes of the third embodiment are replaced by electromagnets. Each of the electromagnets is configured to generate a modulated magnetic field adapted to transmit a 14-bit-vector characterizing a food item that is associated with the electromagnet.

Figure 14:
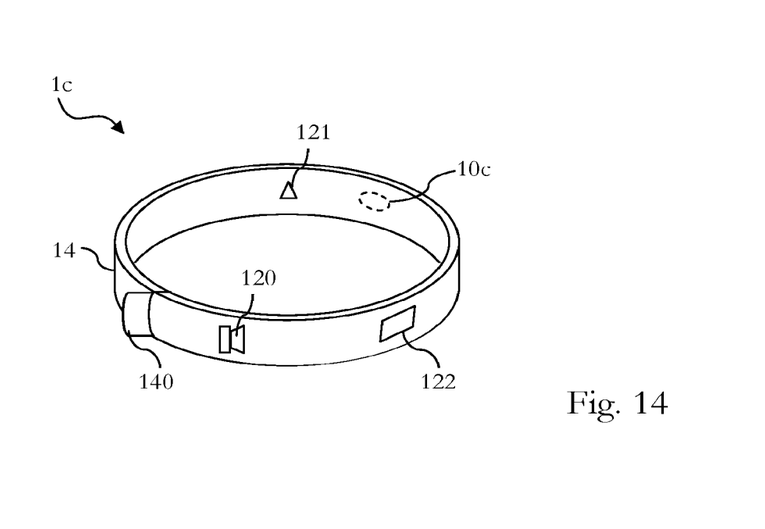
FIG. 14 schematically illustrates a smart band as mobile device of a fourth and a fifth embodiment of a system for providing user-specific item property information.

Furthermore, the infrared detector of the smart band of the third embodiment is replaced by a Hall sensor 10c for detecting a magnetic field. A corresponding smart band 1c is illustrated by FIG. 14. The smart band 1c comprises a band body 14 with a fastener 140. The band body 14 supports the Hall sensor 10c, a processor (not shown) and output units such as a loudspeaker 120, a vibrating unit 121 and an LED 122. The Hall sensor 10c is embedded in the band body 14.

The processor (not shown) is configured to process the sensor signal received from the Hall sensor 10c in an analog way as the sensor signal received from the infrared sensor in the third embodiment and to generate an output signal.

Fifth Embodiment

The mobile device of the fifth embodiment is represented by the smart band 1c as shown by FIG. 14. With respect to the details of the smart band 1c it is referred to the fourth embodiment.

The smart band 1c is for example used in a real-world scene that differs from the real-world scene 2 of FIG. 3 only in that the self-service counter containing the case boards 200, 201 does not comprise infrared diodes. Instead, plates supporting food items containing any ingredient of the above mentioned list of 14 ingredients of food that are responsible for 90% of all allergies are provided with a permanent magnet.

Figure 15:
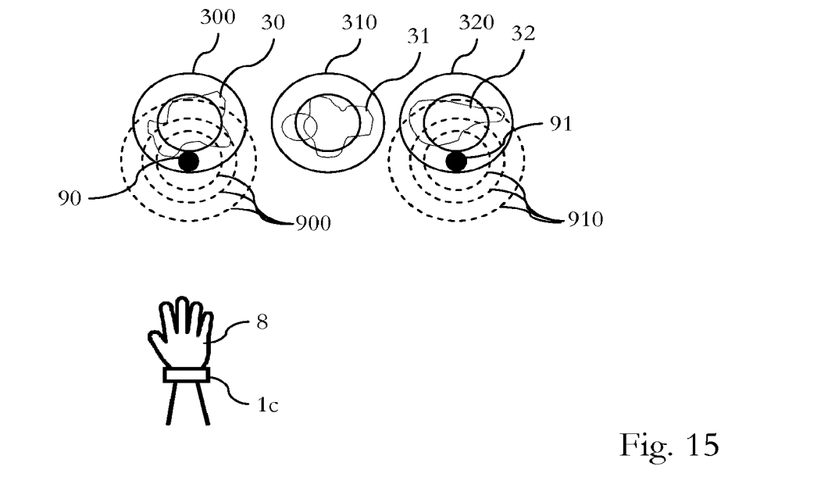
FIG. 15 schematically illustrates a plan view of the system according to the fifth embodiment, and FIG. 16 schematically illustrates a plan view of the system according to the fifth embodiment, where the smart band approaches a particular item on the self-service counter.

FIG. 15 shows a view from below on the plates 300, 310, 320 supporting the food items 30 to 32 on the lower case board (not shown in FIG. 15). The user's arm is positioned in front of the plate 300, 310, 320 disposed in the self-service counter of the real-world scene. In the fifth embodiment, the meat dish 31 does not contain soya beans or any other ingredient of the list of 14 allergy-triggering ingredients. Accordingly, only plate 300 with the pasta dish 30 and plate 320 with the fish dish 32 are provided with a permanent magnet 90, 91 having a static magnetic field indicated by the schematic magnetic field lines 900, 910. The permanent magnets 90, 91 are glued to a bottom side of each plate 300, 320 supporting a dish 30, 32 containing at least one of the 14 allergy-triggering ingredients.

In the situation shown by FIG. 15, the user's hand is located remotely from the plates 300, 310, 320 and the Hall sensor 10c does not detect a magnetic field (no field).

Figure 16:
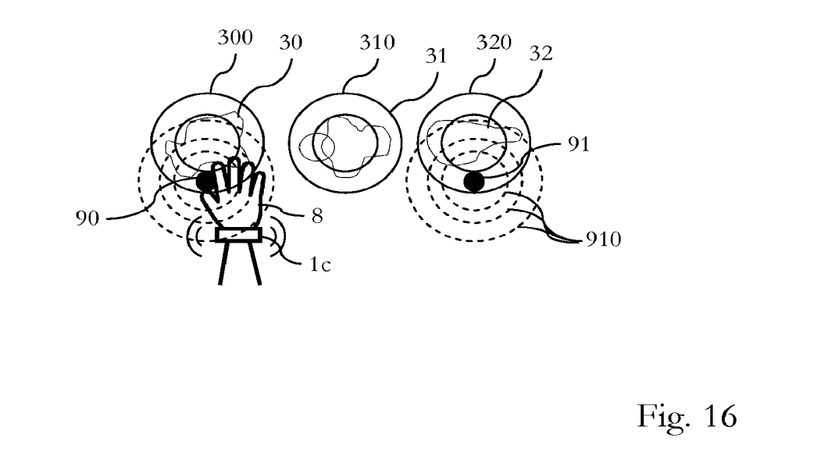

If the user moves his hand towards the plate 300 as presented by FIG. 16, the Hall sensor 10c detects the magnetic field and an information that the magnetic field increases while moving the hand (field up). If the user moves his hand from the plate 300 towards the plate 310, the Hall sensor 10c first detects the magnetic field and an information that the magnetic field decreases while moving the hand (field down) and then detects no magnetic field (no field).

Thus, the Hall sensor 10c may provide ternary information to the processor, namely "no field", "field up" and "field down". In case of "field up" the processor characterizes a food item in close proximity to the user's hand as including at least one of the ingredients of the list of the 14 ingredients causing allergies. In case of "no field" or "field down" the processor characterizes a food item in close proximity to the user's hand as probably not including any of the 14 ingredients causing allergies.

Thus, if the user moves his hand towards the plate 300 as presented by FIG. 16 the processor extracts from the sensor data the information that the pasta dish 30 comprises at least one of the 14 allergy-triggering ingredients. In this case, an output signal is generated that is a combination of an audio signal and a tactile signal. The output signal generated by the processor is output as warning sound by the loudspeaker 120 and as vibration by the vibrating unit 121.

A corresponding procedure is performed when the user moves his hand towards the fish dish 32.

If the user moves his hand towards the meat dish 31, the processor determines that the probability is low that the meat dish comprises any of the 14 allergy-triggering ingredients. In response, an output signal is generated that is a visible signal. The output signal is output as flashing of the LED 122.

In particular, when the magnetic field range of the permanent magnets 90, 91 is small, e.g. smaller than a distance between center points of adjacent plates, it may be accurately determined whether a dish comprises one or more allergy triggering ingredients or not.

The described embodiments or even separated features of the described embodiments may be combined in any possible combination, even if such a combination is not explicitly mentioned herein.

Summarizing, in a cafeteria, where the food is visibly displayed, and the user selects from it, there may be an information transmitter attached to every location where a food item is placed, e.g. in the form of an infrared diode, or by modulating the visible light used to illuminate the food. A user with an appropriate receiver, like e.g. a smart glass or a smartphone, will receive the coded information and the smart glass or the smartphone may then correlate the received 14 bits with the known allergies of the user, and e.g. create a reddish overlay over the food items that will not be tolerated by the user. This way, a completely intuitive, unobtrusive, and privacy-conserving (since the information about the user's allergy will not be shared with anybody) user interface can be achieved, allowing the user to perform the selection much faster and much more intuitive than before. Extensions, like different color overlays for different allergens, are easily conceivable.

It is to be noted with respect to all embodiments that the system for providing user-specific item property information may be used in real world scenes that differ from the ones presented by the embodiments. Furthermore, the item identifier code may have another form than the 14-bit-vector based on the ordered list of 14 ingredients triggering an allergy and/or content and the items may be items other than food items.

The methods described above can also be implemented as a computer program causing a computer and/or a processor, such as processor 11 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below. (1) Mobile device, comprising:
  a sensor configured to wirelessly receive an identification signal including an item identifier code, the identification signal being emitted by a low-rate transmission device associated with an item, wherein the sensor receives the identification signal from a direction of the item; and
  a processor configured to generate an output signal based on the item identifier code.
(2) Mobile device of (1), wherein the identification signal is a modulated signal.
(3) Mobile device of (1) or (2), wherein the identification signal is an electromagnetic wave.
(4) Mobile device of anyone of (1) to (3), wherein the item identifier code of the identification signal is a bit vector or a bit-matrix of 50 bit or less.
(5) Mobile device of anyone of (1) to (4),
  wherein the identification signal is a signal emitted from the low-rate transmission device directly towards the sensor, wherein the low-rate transmission device is arranged at a location in a predetermined area surrounding the item; or
  wherein the identification signal is a signal emitted from the low-rate transmission device towards the item and reflected by the item towards the sensor, wherein the low-rate transmission device is arranged to illuminate the item.
(6) Mobile device of anyone of (1) to (5),
  wherein the identification signal is an infrared light signal and the sensor is an infrared light sensor or an image sensor; or
  wherein the identification signal is a visible light signal and the sensor is an image sensor.
(7) Mobile device of anyone of (1) to (6), wherein the processor is configured
  to determine on the basis of the item identifier, whether the item has a predetermined property or not; and
  to generate the output signal dependent on whether the item has the predetermined property or not.
(8) Mobile device of anyone of (1) to (7), wherein the processor is further configured
  to determine an item location information based on a positional relationship of the sensor relative to the item; and
  to generate the output signal further based on the item location information.
(9) Mobile device of (8), wherein
  the identification signal is a signal having high directivity;
  the sensor has a small aperture angle; and
  the processor is configured
    to determine the item location information on the basis of whether the sensor receives the identification signal or not; and
    to generate the output signal only when the identification signal is received.
(10) Mobile device of (8), wherein
  the sensor is an image sensor configured to capture consecutive images of a scene including the item; and
  the processor is configured to determine the item location information by recognizing an area or a point within a region of the image, the region of the image representing the item or a predetermined area surrounding the item.
(11) Mobile device of any one of (1) to (10), wherein the processor is configured to generate an image signal, an audio signal and/or a tactile signal as output signal.
(12) Mobile device of anyone of (1) to (11), further comprising a user interface configured to output the output signal.
(13) Mobile device of (12), wherein the user interface comprises a display means, an audio interface and/or a tactile interface.
(14) Mobile device of (12) or (13), wherein the user interface is a display means that is configured to display a virtual object such that the virtual object overlaps the item or an image of the item in a direction perpendicular to a plane of the display means or in a viewing direction of a user using the mobile device.
(15) Mobile device of anyone of (1) to (14), wherein the mobile device is one selected from a smart phone, a tablet computer, a smart watch, an electronic wristband, electronic glasses, an e-book reader or a smart lens.
(16) System, comprising:
  a low-rate transmission device configured to emit an identification signal comprising an item identifier code, wherein the low-rate transmission device is associated with an item; and
  a mobile device, comprising:
    a sensor configured to wirelessly receive the identification signal from a direction of the item; and
    a processor configured to generate an output signal based on the item identifier code.
(17) System of (16), wherein the low-rate transmission device is configured to emit a modulated signal.
(18) System of (16) or (17), wherein the low-rate transmission device is configured to emit an electromagnetic wave.
(19) System of anyone of (16) to (18), wherein the item identifier code of the identification signal is a bit-vector or a bit-matrix of 50 bit or less.

(20) System of anyone of (16) to (19),
  wherein the low-rate transmission device is arranged at a location in a predetermined area surrounding the item and wherein the low-rate transmission device is configured to emit the identification signal directly towards the sensor; or
  wherein the low-rate transmission device is arranged to illuminate the item and wherein the low-rate transmission device is configured to emit the identification signal from the low-rate transmission device towards the item, such that the identification signal is reflected by the item towards the sensor.
(21) System of anyone of (16) to (20),
  wherein the low-rate transmission device comprises an infrared light emitter configured to emit infrared light as identification signal and the sensor is an infrared light sensor or an image sensor; or
  wherein the low-rate transmission device comprises a visible light source configured to emit visible light as identification signal and the sensor is an image sensor.
(22) System of anyone of (16) to (21), wherein the processor is configured
  to determine on the basis of the item identifier, whether the item has a predetermined property or not; and
  to generate the output signal dependent on whether the item has the predetermined property or not.
(23) System of anyone of (16) to (22), wherein the processor is further configured
  to determine an item location information based on a positional relationship of the sensor relative to the item; and
  to generate the output signal further based on the item location information.
(24) System of (23), wherein
  the low-rate transmission device is configured to emit a signal having high directivity;
  the sensor has a small aperture angle; and
  the processor is configured
    to determine the item location information on the basis of whether the sensor receives the identification signal or not; and
    to generate the output signal only when the identification signal is received.
(25) System of (23), wherein
  the sensor is an image sensor configured to capture consecutive images of a scene including the item; and
  the processor is configured to determine the item location information by recognizing an area or a point within a region of the image, representing the item or representing a predetermined area surrounding the item.
(26) System of anyone of (16) to (25), wherein the processor is configured to generate an image signal, an audio signal and/or a tactile signal as the output signal.
(27) System of anyone of (16) to (26), wherein the mobile device further comprises a user interface configured to output the output signal.
(28) System of (27), wherein the user interface comprises a display means, an audio interface and/or a tactile interface.
(29) System of (27) or (28), wherein the user interface is a display means that is configured to display a virtual object such that the virtual object overlaps the item or an image of the item in a direction perpendicular to a plane of the display means or in a viewing direction of a user using the mobile device.
(30) System of any one of (16) to (29), wherein the mobile device is one selected from a smart phone, a tablet computer, a smart watch, an electronic wristband, electronic glasses, an e-book reader or a smart lens.
(31) Method, comprising:
  wirelessly receiving an identification signal including an item identifier code, the identification signal being emitted by a low-rate transmission device associated with an item, wherein the identification signal is received from a direction of the item; and
  generating an output signal based on the item identifier code.
(32) Method of (31), wherein the identification signal is a modulated signal.
(33) Method of (31) or (32), wherein the identification signal is an electromagnetic wave.
(34) Method of any one of (31) to (33), wherein the item identifier code of the identification signal is a bit-vector or a bit-matrix of 50 bit or less.
(35) Method of anyone of (31) to (34),
  wherein receiving the identification signal comprises receiving the identification signal directly from the low-rate transmission device; or
  wherein receiving the identification signal comprises receiving the identification signal as a signal reflected by the item.
(36) Method of anyone of (31) to (35), wherein the identification signal is an infrared light signal or a visible light signal.
(37) Method of anyone of (31) to (36), comprising:
  determining on the basis of the item identifier, whether the item has a predetermined property or not; and
  generating the output signal dependent on whether the item has the predetermined property or not.
(38) Method of any one of (31) to (37), comprising:
  determining an item location information based on a positional relationship of a sensor relative to the item; and
  generating the output signal further based on the item location information.
(39) Method of (38), wherein
  receiving the identification signal comprises receiving a signal having high directivity with the sensor, the sensor having a small aperture angle; and wherein
  generating the output signal comprises:
    determining the item location information on the basis of whether the sensor receives the identification signal or not; and
    generating the output signal only when the identification signal is received.
(40) Mobile device of (38), wherein
  receiving the identification signal comprises capturing consecutive images of a scene including the item; and
  determining the item location information comprises recognizing an area or a point within a region of the image, the region of the image representing the item or a predetermined area surrounding the item.
(41) Method of anyone of (31) to (40), wherein generating the output signal comprises generating an image signal, an audio signal and/or a tactile signal.
(42) Method of anyone of (31) to (41), further comprising: outputting the output signal.
(43) Method of (42), wherein the output signal is an image signal, an audio signal and/or a tactile signal.
(44) Method of (42) or (43), wherein outputting the output signal may comprise displaying a virtual object such that the virtual object overlaps the item or an image of the item in a direction perpendicular to a plane of display means or in a viewing direction of a user.

(45) A computer program comprising program code causing a computer to perform the method according to anyone of (31) to (44), when being carried out on a computer.
(46) A non-transitory computer-readable recording medium that stores therein a computer program product, which, when executed by a processor, causes the method according to anyone of (31) to (44) to be performed.

The invention claimed is:

1. A mobile device, comprising:
   a sensor configured to wirelessly receive an identification signal including an item identifier code, the identification signal being emitted by a low-rate transmission device associated with an item, wherein the sensor receives the identification signal from a direction of the item; and
   a processor configured to
   compare the item identifier code to an item identifier code generated by a user of the mobile device, and
   generate an output signal based on the comparison of item identifier code and the item identifier code generated by the user; and
   a user interface configured to output the output signal, the user interface including a display that is configured to display a virtual object such that the virtual object overlaps the item or an image of the item in a direction perpendicular to a plane of the display or in a viewing direction of a user using the mobile device,
   wherein mobile device is a smart watch, an electronic wristband, electronic glasses, an e-book reader, or a smart lens.

2. The mobile device of claim 1, wherein the identification signal is a modulated signal.

3. The mobile device of claim 1, wherein the item identifier code of the identification signal is a bit-vector or a bit-matrix of 50 bit or less.

4. The mobile device of claim 1,
   wherein the identification signal is a signal emitted from the low-rate transmission device directly towards the sensor, wherein the low-rate transmission device is arranged at a location in a predetermined area surrounding the item; or
   wherein the identification signal is a signal emitted from the low-rate transmission device towards the item and reflected by the item towards the sensor, wherein the low-rate transmission device is arranged to illuminate the item.

5. The mobile device of claim 1,
   wherein the identification signal is an infrared light signal and the sensor is an infrared sensor or an image sensor; or
   wherein the identification signal is a visible light signal and the sensor is an image sensor.

6. The mobile device of claim 1, wherein the processor is configured
   to determine on the basis of the item identifier, whether the item has a predetermined property or not; and
   to generate the output signal dependent on whether the item has the predetermined property or not.

7. The mobile device of claim 1, wherein the processor is further configured
   to determine an item location information based on a positional relationship of the sensor relative to the item; and
   to generate the output signal further based on the item location information.

8. The mobile device of claim 7, wherein
   the sensor is an image sensor configured to capture consecutive images of a scene including the item; and
   the processor is configured to determine the item location information by recognizing an area or a point within a region of the image, the region of the image representing the item or a predetermined area surrounding the item.

9. The mobile device of claim 1, wherein the user interface comprises a display means, an audio interface and/or a tactile interface.

10. A system, comprising:
    a low-rate transmission device configured to emit an identification signal comprising an item identifier code, wherein the low-rate transmission device is associated with an item;
    and
    a mobile device, comprising:
    a sensor configured to wirelessly receive the identification signal from a direction of the item;
    a processor configured to
    compare the item identifier code to an item identifier code generated by a user of the mobile device, and
    generate an output signal based on the comparison of item identifier code and the item identifier code generated by the user; and
    a user interface configured to output the output signal, the user interface including a display that is configured to display a virtual object such that the virtual object overlaps the item or an image of the item in a direction perpendicular to a plane of the display or in a viewing direction of a user using the mobile device,
    wherein mobile device is a smart watch, an electronic wristband, electronic glasses, an e-book reader, or a smart lens.

11. A method for a mobile device, comprising:
    wirelessly receiving an identification signal including an item identifier code, the identification signal being emitted by a low-rate transmission device associated with an item, wherein the identification signal is received from a direction of the item;
    comparing the item identifier code to an item identifier code generated by a user of the mobile device; and
    generating an output signal based on the comparison of item identifier code and the item identifier code generated by the user; and
    outputting the output signal, wherein a virtual object is displayed such that the virtual object overlaps the item or an image of the item in a direction perpendicular to a plane of display means or in a viewing direction of a user,
    wherein mobile device is a smart watch, an electronic wristband, electronic glasses, an e-book reader, or a smart lens.

12. The method of claim 11, comprising:
    determining on the basis of the item identifier, whether the item has a predetermined property or not; and
    generating the output signal dependent on whether the item has the predetermined property or not.

13. The method of claim 11, comprising:
    determining an item location information based on a positional relationship of a sensor relative to the item; and
    generating the output signal further based on the item location information.

14. The method of claim 13, wherein
receiving the identification signal comprises receiving a signal having high directivity with the sensor, the sensor having a small aperture angle; and wherein
generating the output signal comprises:
   determining the item location information on the basis of whether the sensor receives the identification signal or not; and
   generating the output signal only when the identification signal is received.

15. The mobile device of claim 11, wherein
receiving the identification signal comprises capturing consecutive images of a scene including the item; and
determining the item location information comprises recognizing an area or a point within a region of the image, the region of the image representing the item or a predetermined area surrounding the item.

\* \* \* \* \*